(12) United States Patent
Sannodo

(10) Patent No.: US 10,525,949 B2
(45) Date of Patent: Jan. 7, 2020

(54) PARKING ASSIST DEVICE

(71) Applicant: TOYOTA JIDOSHA KABUSHIKI KAISHA, Toyota-shi, Aichi-ken (JP)

(72) Inventor: Shinya Sannodo, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 127 days.

(21) Appl. No.: 15/648,528

(22) Filed: Jul. 13, 2017

(65) Prior Publication Data

US 2018/0022329 A1 Jan. 25, 2018

(30) Foreign Application Priority Data

Jul. 22, 2016 (JP) ................... 2016-144460

(51) Int. Cl.
*B60T 8/24* (2006.01)
*B60T 7/12* (2006.01)
*B60T 8/172* (2006.01)
*B60T 13/66* (2006.01)

(52) U.S. Cl.
CPC ............. *B60T 8/245* (2013.01); *B60T 7/12* (2013.01); *B60T 8/172* (2013.01); *B60T 13/662* (2013.01); *B60T 2201/03* (2013.01); *B60T 2201/04* (2013.01); *B60T 2201/10* (2013.01); *B60T 2260/09* (2013.01); *B60T 2270/402* (2013.01)

(58) Field of Classification Search
CPC . B60T 7/12; B60T 8/172; B60T 8/245; B60T 13/662; B60T 2201/022; B60T 2201/03; B60T 2201/04; B60T 2201/10; B60T 2260/09; B60T 2270/402
See application file for complete search history.

(56) References Cited

U.S. PATENT DOCUMENTS

| 7,103,461 | B2 * | 9/2006 | Iwazaki | B62D 15/0285 701/23 |
| 7,660,659 | B2 * | 2/2010 | Watanabe | B62D 15/0275 340/435 |
| 7,681,963 | B2 * | 3/2010 | Sherman | B60T 13/04 180/197 |
| 9,849,864 | B2 * | 12/2017 | Bales | B60T 8/1708 |
| 10,077,073 | B2 * | 9/2018 | Allexi | B60W 50/10 |

(Continued)

FOREIGN PATENT DOCUMENTS

| JP | 2011-218863 A | 11/2011 |
| JP | 2012144157 A | 8/2012 |

(Continued)

*Primary Examiner* — Nicholas Kiswanto
(74) *Attorney, Agent, or Firm* — Sughrue Mion, PLLC

(57) ABSTRACT

A parking assist device includes an electronic control unit. The electronic control unit is configured to: perform parking assist of a vehicle to automatically park the vehicle at a target position while restricting a vehicle speed to an upper limit or lower in accordance with an instruction of a user who is outside the vehicle; determine whether or not the vehicle moves on a road surface having a downhill grade along a travelling direction of the vehicle by the parking assist; and set the upper limit in the case where the vehicle is determined to move on the road surface having a downhill grade to be smaller than the upper limit in the case where the vehicle is not determined to move on the road surface having a downhill grade.

8 Claims, 9 Drawing Sheets

FLAT OR UPHILL GRADE (BRAKE CONTROL ABNORMALITY OCCURS)

DOWNHILL GRADE (BRAKE CONTROL ABNORMALITY OCCURS)

(56) References Cited

U.S. PATENT DOCUMENTS

2014/0019027 A1\* 1/2014 Kojima .................. B60L 58/40
                                                    701/102
2015/0032323 A1   1/2015 Nijakowski et al.
2016/0304088 A1\* 10/2016 Barth ........................ B60T 7/22
2017/0120903 A1\*  5/2017 Lavoie ...................... B60T 7/22

FOREIGN PATENT DOCUMENTS

| JP | 2015-509455 A | 3/2015 |
| JP | 2015077862 A | 4/2015 |
| WO | 2012095717 A2 | 7/2012 |

\* cited by examiner

FLAT OR UPHILL GRADE (BRAKE CONTROL ABNORMALITY DOES NOT OCCUR)

DOWNHILL GRADE (BRAKE CONTROL ABNORMALITY DOES NOT OCCUR)

FLAT OR UPHILL GRADE (BRAKE CONTROL ABNORMALITY OCCURS)

DOWNHILL GRADE (BRAKE CONTROL ABNORMALITY OCCURS)

DOWNHILL GRADE (BRAKE CONTROL ABNORMALITY OCCURS: Vlim = V2)

PARKING ASSIST DEVICE

INCORPORATION BY REFERENCE

The disclosure of Japanese Patent Application No. 2016-144460 filed on Jul. 22, 2016 including the specification, drawings and abstract is incorporated herein by reference in its entirety.

BACKGROUND

1. Technical Field

The present disclosure relates to the technical field of a parking assist device capable of performing parking assist that automatically park a vehicle at a target position.

2. Description of Related Art

Disclosed in Japanese Patent Application Publication No. 2011-218863 is a parking assist device configured to perform parking assist that allows automatic parking of a vehicle at a target position by automatically moving the vehicle along a moving route of the vehicle in accordance with an instruction of a user (for example, a driver) who is outside the vehicle, the moving route extending from a current vehicle position to a target position where the vehicle should be parked.

Disclosed in Published Japanese Translation of PCT application No. 2015-509455 is a parking assist device configured to brake a vehicle using a gear device, when an abnormality of a normal brake device (for example, a hydraulic brake device) occurs while the aforementioned parking assist is in operation. A parking assist device disclosed in Published Japanese Translation of PCT application No. 2015-509455 in particular assumes possible occurrence of an abnormality (referred to as "brake control abnormality" below) where the parking assist device fails to control a normal brake device to brake a vehicle while parking assist is in operation. The normal brake device is designed based on a fail-safe scheme. Accordingly, even when the brake control abnormality occurs, the vehicle is braked by the normal brake device if a user operates a brake pedal instead of the parking assist device controlling the normal brake device. However, when the brake control abnormality occurs during the parking assist, the user is outside the vehicle during the parking assist, and therefore the user cannot operate the brake pedal. Accordingly, the parking assist device disclosed in JP-A-2015-509455 brakes the vehicle by operating the gear device as an emergency brake device (so-called a reserve brake device) in consideration that the user cannot operate the brake pedal when the brake control abnormality occurs during the parking assist.

SUMMARY

During the parking assist, the vehicle may move on a flat road surface, or may move on a road surface with an uphill grade, or may move on a road surface with a downhill grade. When the vehicle moves on the road surface with a downhill grade, the parking assist device makes the vehicle move to a target position, while braking the vehicle with the normal brake device in order to suppress natural acceleration of the vehicle attributed to the vehicle moving on the road surface with a downhill grade. When the brake control abnormality occurs under the situation where the vehicle is moving on the road surface with a downhill grade, the vehicle naturally accelerates because the vehicle is moving on the road surface with a downhill grade. When the brake control abnormality occurs under the situation where the vehicle is moving on the flat road surface, a possibility that the vehicle immediately starts to accelerate is low unless driving force is transmitted to the vehicle from a driving source such as an engine. Similarly, when the brake control abnormality occurs under the situation where the vehicle is moving on the road surface with an uphill grade, a possibility that the vehicle moves backward on the road surface with an uphill grade and immediately starts to accelerate (that is, to accelerate toward a lower side of the slope) is low as long as driving force is transmitted to the vehicle from the driving source such as an engine. Therefore, when the vehicle moves on the road surface with a downhill grade, there is a high possibility that the vehicle speed increases after the brake control abnormality occurs, as compared with the case where the vehicle moves on the flat road surface or the road surface with an uphill grade. Accordingly, when the vehicle moves on the road surface with a downhill grade, it becomes difficult for an emergency brake device (so-called reserve brake device) to brake the vehicle as compared with the case where the vehicle moves on the flat road surface or the road surface with an uphill grade, even with the emergency brake device being operated due to the occurrence of the brake control abnormality.

The present disclosure provides a parking assist device capable of performing appropriate braking of a vehicle even when an abnormality of the parking assist device occurs during the parking assist, the abnormality being a failure in controlling a normal brake device to brake the vehicle.

A first parking assist device according to a first aspect of the present disclosure includes an electronic control unit. The electronic control unit is configured to: perform parking assist of a vehicle to automatically park the vehicle at a target position, while restricting a vehicle speed to an upper limit or lower in accordance with an instruction of a user who is outside the vehicle; determine whether or not the vehicle moves on a road surface having a downhill grade along a travelling direction of the vehicle by the parking assist; and set the upper limit in the case where the vehicle is determined to move on the road surface having a downhill grade to be smaller than the upper limit in the case where the vehicle is not determined to move on the road surface having a downhill grade.

In the first parking assist device according to the first aspect, the upper limit of the vehicle speed in the case where the vehicle moves on the road surface with a downhill grade is set smaller than the upper limit of the vehicle speed in the case where the vehicle does not move on the road surface with a downhill grade. Accordingly, as compared with the case where the upper limit when the vehicle moves on the road surface with a downhill grade is not set to be small, the vehicle speed becomes small at the time when an abnormality (referred to as "brake control abnormality" below) occurs, the abnormality being a failure of the parking assist device in controlling a normal brake device to brake the vehicle. As a result, the vehicle speed becomes also small after the vehicle accelerates on the road surface with a downhill grade due to the brake control abnormality. Accordingly, as compared with the case where the upper limit when the vehicle moves on the road surface with a downhill grade is not set to be small, the vehicle is appropriately controlled even when the brake control abnormality occurs during the parking assist.

A parking assist device according to a second aspect of the present disclosure includes an electronic control unit. The electronic control unit is configured to: perform parking assist of a vehicle to automatically park the vehicle at a target position while controlling a vehicle speed to follow after a target value in accordance with an instruction of a user who is outside the vehicle; determine whether or not the vehicle moves on a road surface having a downhill grade along a travelling direction of the vehicle by the parking assist; and set the target value in the case where the vehicle is determined to move on the road surface having a downhill grade to be smaller than the target value in the case where the vehicle is not determined to move on the road surface having a downhill grade.

In the parking assist device according to the second aspect, the target value of the vehicle speed in the case where the vehicle moves on the road surface with a downhill grade is set smaller than the target value of the vehicle speed in the case where the vehicle does not move on the road surface with a downhill grade. Accordingly, also in the second parking assist device that sets the target value as in the first parking assist device that sets the upper limit, the vehicle is appropriately braked even when the brake control abnormality occurs during the parking assist.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The embodiment of the present disclosure will be described below with reference to the accompanying drawings. In the following description, the parking assist device of the embodiment is mounted on a vehicle 1.

(1) Configuration of Vehicle 1

Figure 1:
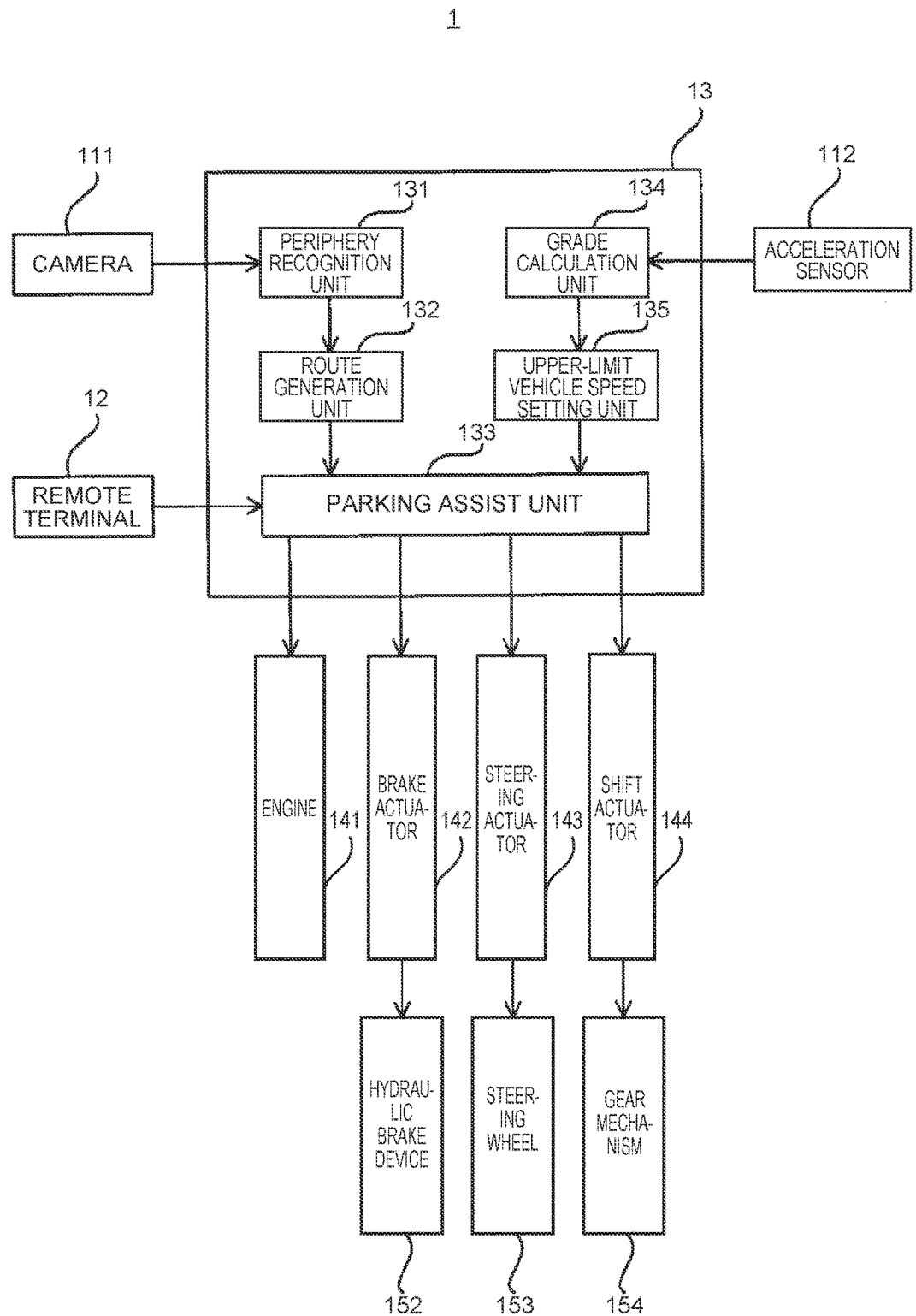
FIG. 1 is a block diagram illustrating the configuration of a vehicle of a present embodiment.

First, the configuration of the vehicle 1 in the present embodiment will be described with reference to FIG. 1. As illustrated in FIG. 1, the vehicle 1 includes a camera 111, an acceleration sensor 112, an electronic control unit (ECU) 13 as one specific example of "the parking assist device" described before, an engine 141, a brake actuator 142, a steering actuator 143, a shift actuator 144, a hydraulic brake device 152 as one specific example of "the first brake device" described before, a steering wheel 153, and a gear mechanism 154 as one specific example of "the second brake device" described before.

The camera 111 is an imaging device that images the periphery of the vehicle 1. The acceleration sensor 112 detects an acceleration (a longitudinal acceleration and a lateral acceleration to be specific) of the vehicle 1.

The ECU 13 controls operation of the entire vehicle 1. In the present embodiment in particular, the ECU 13 performs parking assist operation to automatically park the vehicle 1 at a target position (for example, a parking area, a parking section in the parking area, a parking section on a road, etc.). Furthermore, the ECU 13 performs, while operating the parking assist operation, upper-limit vehicle speed setting operation to set an upper limit (which is referred to as "upper-limit vehicle speed" below) Vlim of the vehicle speed V of the vehicle 1 during the period when the parking assist operation is performed. The upper-limit vehicle speed Vlim is one specific example of "the upper limit" described before.

The ECU 13 performs the parking assist operation (and also the upper-limit vehicle speed setting operation) in accordance with an instruction of a user (for example, a driver) who uses a remote terminal 12. Specifically, the remote terminal 12 is a small appliance that the user can carry and that can communicate with the ECU 13. The remote terminal 12 has a manual operation button that is pressed by the user who requests execution of the parking assist operation. The remote terminal 12 notifies the ECU 13 of the manual operation button being pressed. The ECU 13 starts the parking assist operation when the manual operation button which was not pressed until now is newly pressed. The ECU 13 continues the parking assist operation while the manual operation button is being pressed. The ECU 13 ends the parking assist operation when the continuously pressed manual operation button is released.

In the present embodiment, since the user can request execution of the parking assist operation using the remote terminal 12, the user is assumed to request execution of the parking assist operation mainly by operating the remote terminal 12 from the outside of the vehicle 1. The user may also request execution of the parking assist operation by operating the remote terminal 12 inside the vehicle 1 (for example, in a vehicle cabin).

In order to perform the parking assist operation and the upper-limit vehicle speed setting operation, the ECU 13 includes a periphery recognition unit 131, a route generation unit 132, a parking assist unit 133, a grade calculation unit 134, and an upper-limit vehicle speed setting unit 135 provided as a logically implemented processing block or a physically implemented processing circuit inside the ECU 13.

Figure 2:
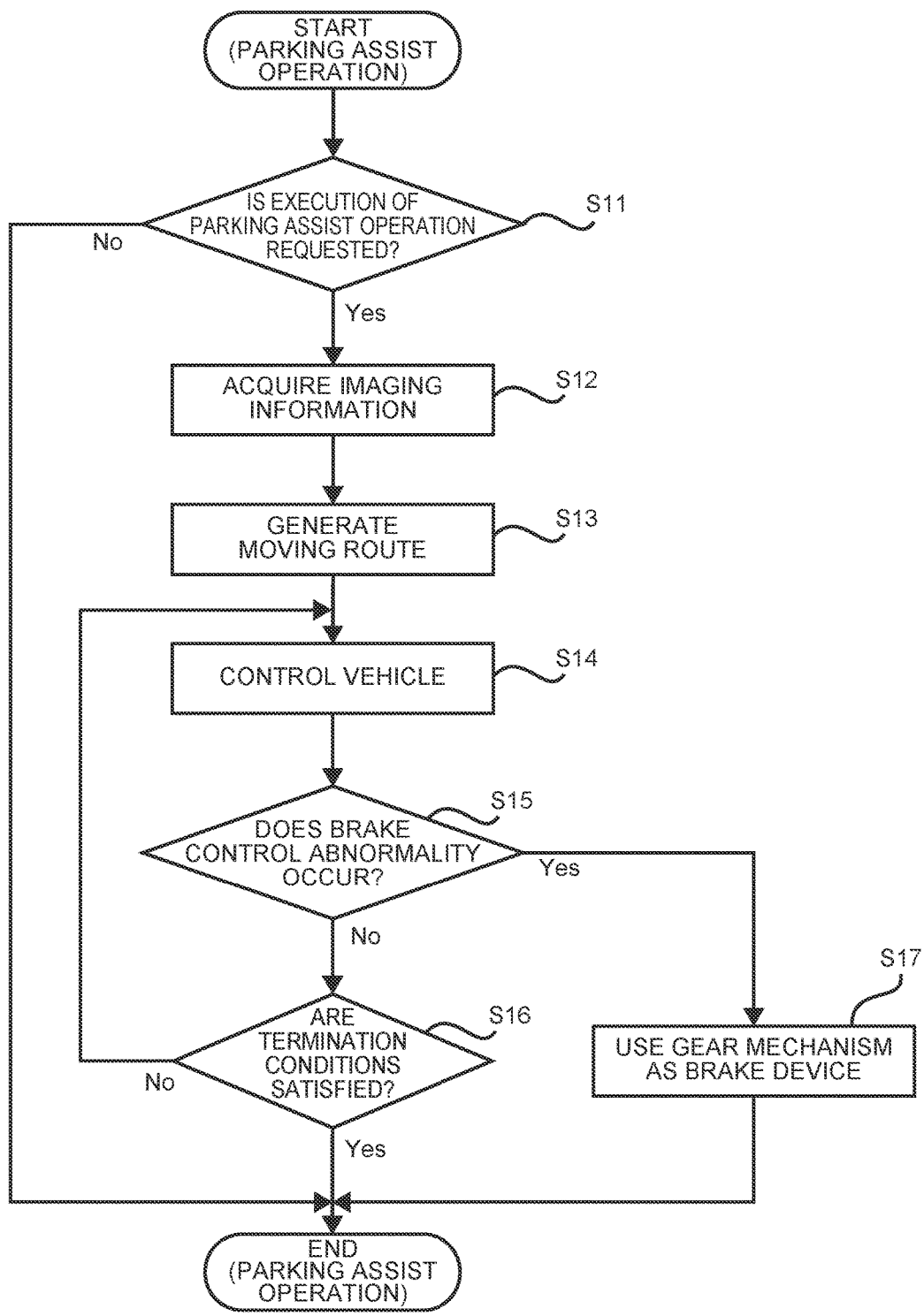
FIG. 2 is a flowchart illustrating the flow of parking assist operation in the present embodiment.

While the operation of each of the component members from the periphery recognition unit 131 to the upper-limit vehicle speed setting unit 135 will be described later with reference to FIG. 2 and other drawings, an outlined description of the operation will be given below. The periphery recognition unit 131 recognizes the situation around the vehicle 1 based on image information which is an imaging result of the camera 111. The route generation unit 132 generates (in other words, calculates) a moving route that the vehicle 1 should take to move from a current position of the vehicle 1 to a target position based on a recognition result of the periphery recognition unit 131. The parking assist unit 133 controls the engine 141, the brake actuator 142, the steering actuator 143, and the shift actuator 144 such that the vehicle 1 automatically moves along the moving route generated by the route generation unit 132. The grade calculation unit 134 calculates the grade of the road surface on which the vehicle 1 positions based on acceleration information as a detection result of the acceleration sensor 112. The upper-limit vehicle speed setting unit 135 sets an upper-limit vehicle speed Vlim based on a calculation result of the grade calculation unit 134. The parking assist unit 133 moves the vehicle 1 such that the vehicle speed V does not exceed the upper-limit vehicle speed Vlim calculated by the upper-limit vehicle speed setting unit 135.

The engine 141 is a driving source that supplies driving force to driving wheels (at least some of the wheels) which are not illustrated. The engine 141 can regulate the driving force supplied to the driving wheels under control of the parking assist unit 133. The brake actuator 142 controls the hydraulic brake device 152 that can brake the wheels which are not illustrated so as to apply braking force to the vehicle 1 under control of the parking assist unit 133. The steering actuator 143 steers the steerable steering wheel 153 such that the vehicle 1 moves toward a desired direction under control of the parking assist unit 133. The shift actuator 144 controls the gear mechanism 154 (what is called a gear transmission) capable of transmitting the motive power of the engine 141 to the driving wheels such that a gear range of the gear mechanism 154 is switched to a desired gear range under control of the parking assist unit 133.

(2) Operation of ECU 13

Next, the parking assist operation and the upper-limit vehicle speed setting operation performed by the ECU 13 will be described in order.

(2-1) Flow of Parking Assist Operation

First, the flow of the parking assist operation will be described with reference to the flowchart of FIG. 2. As illustrated in FIG. 2, the parking assist unit 133 communicates with the remote terminal 12 to determine whether or not the user requests execution of the parking assist operation (step S11). Specifically, the parking assist unit 133 determines whether or not the user presses the manual operation button of the remote terminal 12. When the user presses the manual operation button of the remote terminal 12, the parking assist unit 133 determines that the user requests execution of the parking assist operation.

When it is determined that the user does not request execution of the parking assist operation (step S11: No) as a result of determination in step S11, the ECU 13 ends the parking assist operation illustrated in FIG. 2. When the parking assist operation illustrated in FIG. 2 is ended, the ECU 13 starts the parking assist operation illustrated in FIG. 2 again after the lapse of a first prescribed period.

When it is determined that the user requests execution of the parking assist operation as a result of determination in step S11 (step S11: Yes), the periphery recognition unit 131 acquires from the camera 111 the imaging information as an imaging result of the camera 111 (step S12). Then, the route generation unit 132 generates a moving route that the vehicle 1 should take to move from the current position of the vehicle 1 to a target position based on the imaging information acquired in step S12 (step S13). As for a generation method of the moving route based on image information, an existing generation method (such as a generation method disclosed in Japanese Patent Application Publication No. 2011-218863) may be adopted. Accordingly, the detailed description thereof is omitted herein.

Then, the parking assist unit 133 controls the engine 141, the brake actuator 142, the steering actuator 143, and the shift actuator 144 so as to automatically move the vehicle 1 along the moving route generated in step S13 (step S14). That is, the parking assist unit 133 controls the engine 141, controls the hydraulic brake device 152 through the brake actuator 142, controls the steering wheel 153 through the steering actuator 143, and controls the gear mechanism 154 through the shift actuator 144 so as to automatically move the vehicle 1 (step S14). In this case, the parking assist unit 133 moves the vehicle 1 so that the vehicle speed V does not exceed the upper-limit vehicle speed Vlim set by the later-described upper-limit vehicle speed setting operation. For example, the parking assist unit 133 monitors an actual vehicle speed V detected by a vehicle speed sensor which is not illustrated, and controls at least one of the component members from the engine 141 to the shift actuators 144 so that the actual vehicle speed V does not exceed the upper-limit vehicle speed Vlim. In this case, it can be said that the parking assist unit 133 performs feedback control to limit the vehicle speed V to the upper-limit vehicle speed Vlim or lower. As a result, the vehicle 1 is automatically parked at a target position, without requiring the user operating the accelerator pedal, the brake pedal, or the steering wheel.

While the parking assist unit 133 automatically moves the vehicle 1, the parking assist unit 133 determines whether or not an abnormality ("brake control abnormality") occurs, the abnormality being a failure of the parking assist unit 133 in controlling the hydraulic brake device 152 through the brake actuator 142 (step S15). The term "brake control abnormality" used herein corresponds to an abnormality where, although the parking assist unit 133 controls the hydraulic brake device 152 through the brake actuator 142, the hydraulic brake device 152 fails to brake the vehicle 1 in a braking mode corresponding to a controlled variable of the parking assist unit 133. Specifically, in the case where the parking assist unit 133 controls the hydraulic brake device 152 such that the hydraulic brake device 152 brakes the vehicle 1, the vehicle 1 should normally decelerate in a deceleration mode corresponding to the controlled variable of the parking assist unit 133. Therefore, the parking assist unit 133 can determine whether or not the brake control abnormality occurs based on the detection result of the acceleration sensor 112. The parking assist unit 133 may use other methods to determine whether or not the brake control abnormality occurs.

Examples of the brake control abnormality include an abnormality attributed to failure of the brake actuator 142. In this case, the brake actuator 142 does not operate normally when the parking assist unit 133 controls the brake actuator 142. Accordingly, the hydraulic brake device 152 does not operate normally either.

Examples of the brake control abnormality also include an abnormality attributed to failure in an unillustrated brake ECU that is specialized in control of the brake actuator 142. In the ECU 13 illustrated in FIG. 1 the parking assist unit 133 directly controls the engine 141, the brake actuator 142, the steering actuator 143, and the shift actuator 144. However, the ECU 13 may include, independently of the parking assist unit 133, an engine ECU specialized in control of the engine 141, a brake ECU specialized in control of the brake actuator 142, a steering ECU specialized in control of the steering actuator 143, and a shift ECU specialized in control of the shift actuator 144. In such an ECU 13, the parking assist unit 133 controls the engine ECU, the brake ECU, the steering ECU, and the shift ECU so that the vehicle 1 automatically moves along the moving route generated in step S13. In this case, when the brake ECU is out of order, the brake ECU does not operate normally when the parking assist unit 133 controls the brake ECU. Consequently, the brake actuator 142 does not operate normally either, which also disturbs normal operation of the hydraulic brake device 152.

Even when such a brake control abnormality occurs, the vehicle 1 is braked if the user operates the brake pedal since the hydraulic brake device 152 is designed based on the fail-safe scheme. However, in the present embodiment, since the user is outside the vehicle 1 while the parking assist operation is performed, the user cannot operate the brake pedal even in the case where the brake control abnormality occurs.

When it is determined, as a result of determination in step S15, that the brake control abnormality does not occur (step S15: No), the parking assist unit 133 determines whether or not termination conditions for terminating the parking assist operation are satisfied (step S16). The termination conditions may include a first condition where the vehicle 1 reaches at a target position. The terminating conditions may include a second condition where the user does not request execution of the parking assist operation, (i.e., the user does not press the manual operation button of the remote terminal 12). The termination conditions may include a third condition where a fault occurs or possibly occurs in the vehicle 1, the fault being difficulty or failure in continuation of the parking assist operation.

When it is determined, as a result of determination in step S16, that the termination conditions are satisfied (step S16: Yes), the ECU 13 ends the parking assist operation illustrated in FIG. 2. When it is determined, as a result of determination in step S16, that the termination conditions are not satisfied (step S16: No), the operation subsequent to step S14 is repeated. That is, the parking assist unit 133 keeps on moving the vehicle 1 in an automatic manner.

When it is determined, as a result of determination in step S15, that the brake control abnormality occurs (step S15: Yes), there is a high possibility that the parking assist unit 133 cannot appropriately move the vehicle 1. That is, there is a high possibility that the parking assist operation is not appropriately performed. Accordingly, when it is determined that the hydraulic brake device 152 does not operate normally, the ECU 13 ends the parking assist operation illustrated in FIG. 2.

However, when the parking assist operation is terminated due to the occurrence of the brake control abnormality, there is a possibility that the vehicle 1 does not stop (i.e., is still moving). However, the parking assist unit 133 cannot brake the vehicle 1 using the hydraulic brake device 152. Furthermore, since the user is outside the vehicle while the parking assist operation is performed, the user cannot operate the brake pedal either. Accordingly, before terminating the parking assist operation or in concurrence with the termination of the parking assist operation, the parking assist unit 133 uses the gear mechanism 154 in place of the hydraulic brake device 152 as a brake device for braking the vehicle 1 (step S17). Specifically, the parking assist unit 133 controls the shift actuator 144 such that a gear range of the gear mechanism 154 is switched to a parking range (so called a P range). As a result, the gear inside the gear mechanism 154 is locked with a shift pin (or a parking lock pole), so that the vehicle 1 is braked. That is, like the hydraulic brake device 152, the gear device 154 operates as a brake device capable of decelerating or stopping the vehicle 1 by braking the vehicle 1.

Here, when the vehicle 1 is moving, the gear inside the gear mechanism 154 is also rotating. Accordingly, when the gear range is switched to the P range under the situation where the vehicle 1 is moving, the shift pin is inserted toward the rotating gear. When the vehicle speed V is relatively small, the shift pin inserted toward the rotating gear can rock the gear since the rotation inertia force of the gear is relatively small. On the contrary, when the vehicle speed V is relatively large, there is a possibility that the shift pin inserted toward the rotating gear cannot rock the gear since the rotation inertia force of the gear is relatively large. Rather, the shift pin may possibly be damaged by the rotation of the gear.

Accordingly, in the present embodiment, the parking assist unit 133 uses the gear mechanism 154 as a brake device when the vehicle speed V is smaller than an allowable vehicle speed Val, whereas the parking assist unit 133 does not use the gear mechanism 154 as a brake device when the vehicle speed V is larger than the allowable vehicle speed Val. When the vehicle speed V coincides with the allowable vehicle speed Val, the parking assist unit 133 may or may not use the gear mechanism 154 as a brake device. The allowable vehicle speed Val is set from a viewpoint of preventing damage (damage of the aforementioned shift pin in particular) of the gear mechanism 154 operating as a brake device. For example, the allowable vehicle speed Val is preset to a vehicle speed which can provide discrimination between a state where the vehicle speed V is relatively small in such a degree that there is almost no possibility of the shift pin being damaged by insertion toward the gear, and a state where the vehicle speed V is a relatively large in such a degree that insertion of the shift pin should be avoided since inserting the shift pin toward the gear damages or possibly damages the shift pin. The allowable vehicle speed Val is one specific example of "the allowable value" described before.

(2-2) Flow of Upper Limit Vehicle-Speed Setting Operation

Figure 3:
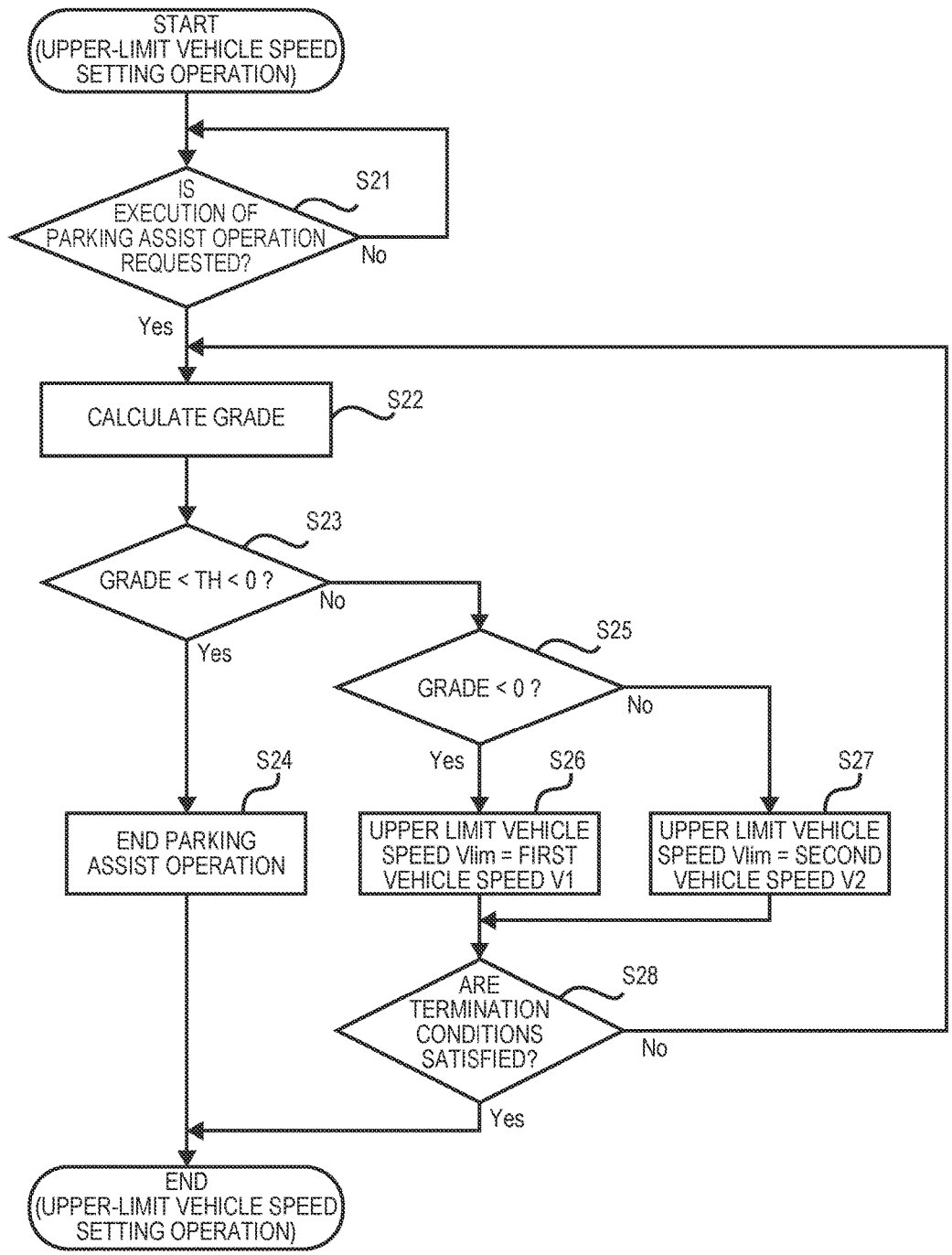
FIG. 3 is a flowchart illustrating the flow of upper-limit vehicle speed setting operation in the present embodiment.

Next, the flow of the upper-limit vehicle speed setting operation will be described with reference to the flowchart of FIG. 3. As illustrated in FIG. 3, in the upper-limit vehicle speed setting operation as in the parking assist operation, the parking assist unit 133 communicates with the remote terminal 12 to determine whether or not the user requests execution of the upper-limit vehicle speed setting operation (step S21).

When it is determined, as a result of determination in step S21, that the user does not request execution of the parking assist operation (step S21: No), the necessity of performing the upper-limit vehicle speed setting operation is low since the parking assist operation is not performed. Accordingly, the ECU 13 ends the upper-limit vehicle speed setting operation illustrated in FIG. 3. When the upper-limit vehicle speed setting operation illustrated in FIG. 3 is ended, the ECU 13 starts the upper-limit vehicle speed setting operation illustrated in FIG. 3 again after the lapse of a second prescribed period.

When it is determined, as a result of determination in step S21, that the user requests execution of the parking assist operation (step S21: Yes), the grade calculation unit 134 calculates a grade (a grade along a travelling direction of the vehicle 1 to be specific) of the road surface on which the vehicle 1 is positioned based on acceleration information that is a detection result of the acceleration sensor 112 (step S22). At the time when the processing of step S22 is performed, the grade of the road surface on which the vehicle 1 is positioned is calculated.

The "road surface" in the present embodiment refers to a surface on which the vehicle 1 can move (a surface on which the vehicle 1 can move while the parking assist operation is executed to be specific). Examples of such a road surface include road surfaces of parking areas, road surfaces of passages in the parking areas, road surfaces of the roads connected to the parking areas, and road surfaces of the roads used as a parking area.

When the calculated grade is 0%, it is estimated that the vehicle 1 moves on a flat road surface by the parking assist operation. When the calculated grade is larger than 0%, it is estimated that the vehicle 1 moves on a road surface with an uphill grade (i.e., an uphill road surface) along the travelling direction of the vehicle 1 by the parking assist operation. When the calculated grade is smaller than 0%, it is estimated that the vehicle 1 moves on a road surface with a downhill grade (i.e., a downhill road surface) along the travelling direction of the vehicle 1 by the parking assist operation. Therefore, by calculating the grade, the grade calculation unit 134 can substantially determine whether or not the vehicle 1 travels on a flat road surface, whether or not the vehicle 1 travels on a road surface with an uphill grade, and whether or not the vehicle 1 travels on a road surface with a downhill grade.

The road surface with an uphill grade and the road surface with a downhill grade are relative concepts determined relative to the travelling direction of the vehicle 1. For example, the vehicle 1 may move on a certain road surface to enter in a parking area (i.e., a target position), and then moves on the same road surface to leave the same parking area in a frequent manner. In this case, the road surface may have an uphill grade (or downhill grade) when the vehicle 1 enters in the parking area, whereas when the vehicle 1 leaves the parking area, the road surface may have a downhill grade (or an uphill grade). Similarly, the steering wheel of the vehicle 1 may be turned while the vehicle 1 is entering into a certain parking area in a frequent manner. Also in this case, the road surface to the parking area may have an uphill grade (or downhill grade) for the vehicle 1 before the steering wheel of the vehicle 1 is turned. After the steering wheel of the vehicle 1 is turned, the road surface may have a downhill grade (or an uphill grade).

Then, the grade calculation unit 134 determines whether or not the grade calculated in step S22 is smaller than a specified upper-limit grade TH (provided that TH<0%) (step S23). The upper-limit grade TH corresponds to a maximum value of the downhill grades of the road surfaces where the parking assist operation is applicable (i.e., preset based on the specifications of the parking assist operation as road surfaces where the parking assist operation is applied). In other words, when the downhill grade of a road surface is smaller than the upper-limit grade TH, the parking assist operation is not performed for the vehicle 1 which moves on that road surface.

When it is determined, as a result of determination in step S23, that the grade is smaller than the upper-limit grade TH (step S23: Yes), the upper-limit vehicle speed setting unit 135 notifies the parking assist unit 133 that the parking assist operation should be ended instead of setting the upper-limit vehicle speed Vlim. As a result, the parking assist unit 133 ends the parking assist operation illustrated in FIG. 2. In this case, the ECU 13 also ends the upper-limit vehicle speed setting operation illustrated in FIG. 3.

When it is determined, as a result of determination in step S23, that the grade is larger than the upper-limit grade TH, (step S23: No), the upper-limit vehicle speed setting unit 135 does not notify the parking assist unit 133 that the parking assist operation should be ended. In this case, the grade calculation unit 134 determines whether or not the grade calculated in step S22 is smaller than 0% (step S25). That is, the grade calculation unit 134 determines whether or not the vehicle 1 travels on the road surface with a downhill grade.

In the flowchart illustrated in FIG. 3, the processing of step S25 is performed when the grade coincides with the upper-limit grade TH. However, when the grade coincides with the upper-limit grade TH, the processing of step S24 may be performed.

When it is determined, as a result of determination in step S25, that the grade is smaller than 0%, (step S25: Yes), the upper-limit vehicle speed setting unit 135 sets a first vehicle speed V1 as the upper-limit vehicle speed Vlim (step S26). When it is determined, as a result of determination in step S25, that the grade is not smaller than 0%, (step S25: No), the upper-limit vehicle speed setting unit 135 sets a second vehicle speed V2 larger than the first vehicle speed V1 as the upper-limit vehicle speed Vlim (step S27). That is, the upper-limit vehicle speed setting unit 135 sets the upper-limit vehicle speed Vlim based on the grade calculated in step S22.

The upper-limit vehicle speed setting unit 135 sets the first vehicle speed V1 or the second vehicle speed V2 as the upper-limit vehicle speed Vlim based on a map that defines the first vehicle speed V1 and the second vehicle speed V2 (or other information that can define the first vehicle speed V1 and the second vehicle speed V2). Hereinafter, a more detailed description will be given of the map defining the first vehicle speed V1 and the second vehicle speed V2 with reference to FIG. 4A to FIG. 4E.

Figure 4A:
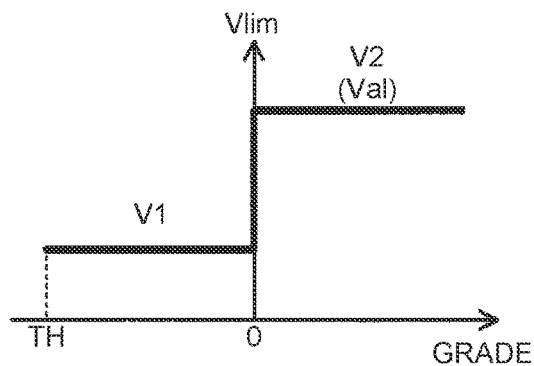
FIG. 4A is a graph view illustrating a relation between the grade of a road surface on which the vehicle is positioned and an upper-limit vehicle speed.
Figure 4B:
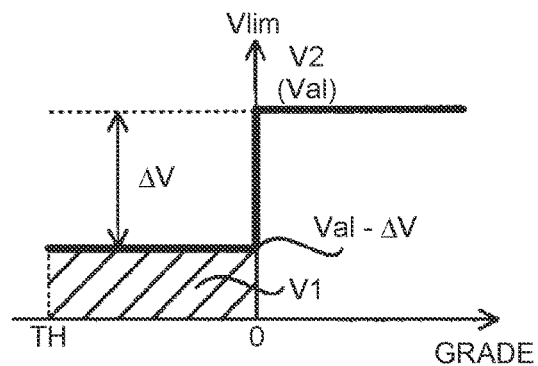
FIG. 4B is a graph view illustrating a relation between the grade of the road surface on which the vehicle is positioned and the upper-limit vehicle speed.

FIG. 4A is a graph view illustrating a first example of the map that defines the first vehicle speed V1 and the second vehicle speed V2. As illustrated in FIG. 4A, the map of the first example defines the first vehicle speed V1 that takes a fixed value regardless of the magnitude of the grade. Similarly, the map of the first example defines the second vehicle speed V2 that takes a fixed value regardless of the magnitude of the grade. The first vehicle speed V1 and the second vehicle speed V2 defined by the map of the first example take values below.

First, the first vehicle speed V1 is set to a value that can realize the state where the vehicle speed V of the vehicle 1, which naturally goes down the road surface with a downhill grade due to the brake control abnormality, does not exceed the allowable vehicle speed Val before the gear mechanism 154 starts to operate as a brake device. Specifically, when the brake control abnormality occurs in the situation where the vehicle 1 moves on the road surface with a downhill grade, the gear mechanism 154 operating as a brake device brakes the vehicle 1. However, in actuality, it takes a certain period of time before the gear mechanism 154 starts to operate as a brake device after the brake control abnormality occurs, the certain period corresponding to a sum of (i) determination time required for the parking assist unit 133 to determine occurrence of the brake control abnormality after the brake control abnormality occurs and (ii) switching time required for completing switching of the gear range of the gear mechanism 154 to the P range (i.e., for actually starting operation of the gear mechanism 154 as a brake device) after the occurrence of the brake control abnormality is determined. Accordingly, when the brake control abnormality occurs in the situation where the vehicle 1 moves on the road surface with a downhill grade, the vehicle 1 naturally goes down the road surface with a downhill grade before the gear mechanism 154 actually starts to operate as a brake device. That is, the vehicle 1 naturally accelerates until the gear mechanism 154 actually starts to operate as a brake device. If the vehicle speed V exceeds the allowable vehicle speed Val by the natural acceleration before the gear mechanism 154 actually starts to operate as a brake device, it becomes impossible for the gear mechanism 154 to operate as a brake device. Accordingly, it is desirable to keep the vehicle speed V of the vehicle 1, which goes down the road surface with a downhill grade due to the brake control abnormality, to stay within the allowable vehicle speed Val before the gear mechanism 154 starts to operate as a brake device.

As described in the foregoing, the parking assist operation is performed for the vehicle 1 moving on the road surface with a downhill grade that is equal to or more than the upper-limit grade TH. Accordingly, the vehicle speed V of the vehicle 1, which goes down the road surface with a downhill grade that coincides with the upper-limit grade TH, becomes larger than the vehicle speed V of the vehicle 1, which goes down the road surface with a downhill grade that is larger than the upper-limit grade TH, under the condition that the vehicle speed V is the same at the time when the brake control abnormality occurs. Therefore, the first vehicle speed V1 can maintain the state where the vehicle speed V of the vehicle 1, which goes down the road surface with a downhill grade that is coincides with the upper-limit grade TH due to the brake control abnormality, does not exceed the allowable vehicle speed Val. The first vehicle speed V1 can also maintain the state where the vehicle speed V of the vehicle 1, which goes down the road surface with a downhill grade smaller than the upper-limit grade TH, does not exceed the allowable vehicle speed Val.

In this connection, the first vehicle speed V1 that can realize the state where the vehicle speed V does not exceed the allowable vehicle speed Val will be examined. First, the vehicle speed V at the time when the brake control abnormality occurs is defined as an initial vehicle speed Vs. When the vehicle 1 not braked by the hydraulic brake device 152 goes down the road surface with a downhill grade that coincides with the upper-limit grade TH during the lapse of the aforementioned determination time and switching time, the vehicle speed V is assumed to increase by a specified increment $\Delta V$. In this case, the vehicle speed V at the time when the gear mechanism 154 starts to operate as a brake device is equal to a sum total of the initial vehicle speed Vs and the increment $\Delta V$. Based on the condition that the vehicle speed V corresponding to the sum total does not exceed the allowable vehicle speed Val, the initial vehicle speed Vs which can satisfy an expression $Vs+\Delta V \leq Val$ becomes the first vehicle speed V1. That is, the first vehicle speed V1 is a value obtained by subtracting the increment $\Delta V$ from the allowable vehicle speed Val or lower. Therefore, the first vehicle speed V1 is a value included in a shaded region of FIG. 4B.

However, as the upper-limit vehicle speed Vlim becomes smaller, the time taken for the vehicle 1 to park at a target position by the parking assist operation becomes longer. Accordingly, to shorten the time taken for the vehicle 1 to park at the target position, it is preferable to coincide the first vehicle speed V1 with the value obtained by subtracting the increment $\Delta V$ from the allowable vehicle speed Val.

Meanwhile, the second vehicle speed V2 coincides with the aforementioned allowable vehicle speed Val. The second vehicle speed V2 may be smaller than the allowable vehicle speed Val.

Figure 4C:
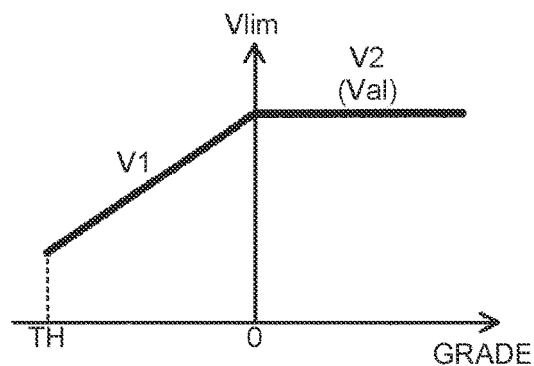
FIG. 4C is a graph view illustrating a relation between the grade of the road surface on which the vehicle is positioned and the upper-limit vehicle speed.
Figure 4D:
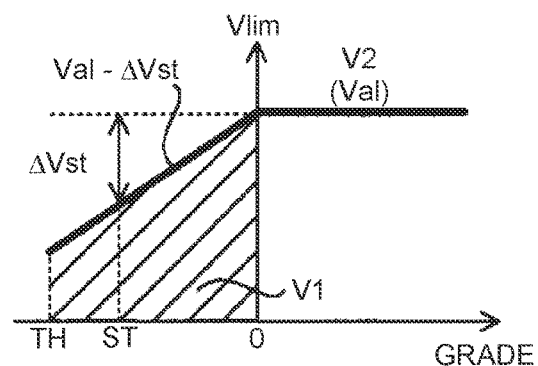
FIG. 4D is a graph view illustrating a relation between the grade of the road surface on which the vehicle is positioned and the upper-limit vehicle speed.

FIG. 4C is a graph view illustrating a second example of the map that defines the first vehicle speed V1 and the second vehicle speed V2. As illustrated in FIG. 4C, the map of the second example defines the first vehicle speed V1 that continuously becomes smaller as the grade becomes smaller. The second vehicle speed V2 defined by the map of the second example is identical to the second vehicle speed V2 defined by the map of the first examples.

Like the first vehicle speed V1 defined by the map of the first example, the first vehicle speed V1 defined by the map of the second example is set to a value that can realize the state where the vehicle speed V of the vehicle 1, which goes down the road surface with a downhill grade due to the brake control abnormality, does not exceed the allowable vehicle speed Val before the gear mechanism 154 starts to operate as a brake device. In the second example, however, the first vehicle speed V1 corresponding to a specified downhill grade is set to a value that can realize the state where the vehicle speed V of the vehicle 1, which goes down the road surface with the specified downhill grade due to the brake control abnormality, does not exceed the allowable vehicle speed Val before the gear mechanism 154 starts to operate as a brake device. Specifically, when the vehicle 1 not braked by the hydraulic brake device 152 goes down the road surface with the specified downhill grade St during the lapse of the aforementioned determination time and switching time, the vehicle speed V is assumed to increase by a specified increment $\Delta Vst$. In this case, the vehicle speed V at the time when the gear mechanism 154 starts to operate as a brake device is equal to a sum total of the aforementioned initial vehicle speed Vs and increment $\Delta Vst$. Based on the condition that the vehicle speed V corresponding to the sum total does not exceed the allowable vehicle speed Val, an initial vehicle speed Vs which can satisfy an expression $Vs+\Delta Vst \leq Val$ becomes the first vehicle speed V1. That is, the first vehicle speed V1 is a value obtained by subtracting the increment $\Delta Vst$ from the allowable vehicle speed Val or lower. Therefore, the first vehicle speed V1 is a value positioned in a shaded region of FIG. 4D. Also in the second example as in the first example, to shorten the time taken for the vehicle 1 to park at the target position, it is preferable to coincide the first vehicle speed V1 with a value obtained by subtracting the increment ΔVst from the allowable vehicle speed Val.

The first vehicle speed V set as the upper-limit vehicle speed V in accordance with the map of the second example becomes equal to or more than the first vehicle speed V set as the upper-limit vehicle speed V in accordance with the map of the first example. Accordingly, in the second map as compared with the map of the first example, the vehicle speed V during the parking assist operation (the vehicle speed V of the vehicle 1 moving on the road surface with a downhill grade to be specific) can be increased. Accordingly, the map of the second example can shorten the time taken for the vehicle 1 to park at a target position as compared with the map of the first example.

Figure 4E:
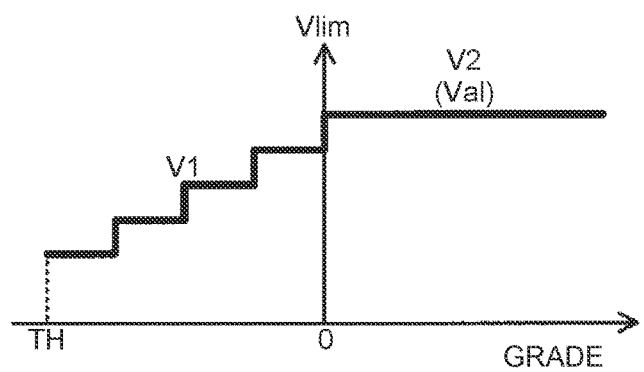
FIG. 4E is a graph view illustrating a relation between the grade of the road surface on which the vehicle is positioned and the upper-limit vehicle speed.

FIG. 4E is a graph view illustrating a third example of the map that defines the first vehicle speed V1 and the second vehicle speed V2. As illustrated in FIG. 4E, the map of the third example is different from the map of the second example in that the first vehicle speed V1 is defined to become smaller in stages as the grade becomes smaller. Like the first vehicle speed V1 defined in the second example, the first vehicle speed V1 defined by the map of the third example is a value obtained by subtracting the increment ΔVst from the allowable vehicle speed Val or lower.

With reference again to FIG. 3, the parking assist unit 133 then determines whether or not the termination conditions are satisfied in the upper-limit vehicle speed setting operation as in the parking assist operation (step S28). When it is determined, as a result of determination in step S28, that the termination conditions are satisfied (step S28: Yes), the ECU 13 ends the upper-limit vehicle speed setting operation illustrated in FIG. 3. When it is determined, as a result of determination in step S28, that the termination conditions are not satisfied (step S28: No), the operation subsequent to step S22 is repeated. That is, the ECU 13 newly calculates a grade and sets an upper-limit vehicle speed Vlim corresponding to the grade. Therefore, even in the case where the grade of the road surface on which the vehicle 1 moves changes, the upper-limit vehicle speed Vlim is properly set in accordance with the changing grade.

(3) Technical Effects of Upper-Limit Vehicle Speed Setting Operation

As described in the foregoing, the ECU 13 can make the upper-limit vehicle speed Vlim (i.e., the first vehicle speed V1), in the case where the vehicle 1 moves on the road surface with a downhill grade, smaller than the upper-limit vehicle speed Vlim (i.e., the second vehicle speed V2) in the case where the vehicle 1 moves on a flat road surface or a road surface with an uphill grade. That is, when the vehicle 1 moves on the road surface with a downhill grade, the first vehicle speed V1 that is relatively smaller is used as the upper-limit vehicle speed Vlim. Accordingly, in the present embodiment, the vehicle speed V at the time when the brake control abnormality occurs becomes smaller as compared with a comparative example in which the relatively small first vehicle speed V1 is not used as the upper-limit vehicle speed Vlim when the vehicle 1 moves on the road surface with a downhill grade (for example, the second vehicle speed V2 is used as the limit vehicle speed Vlim even in the case where the vehicle 1 moves on the road surface with a downhill grade). Accordingly, in the present embodiment, even when the vehicle 1 naturally accelerates due to the brake control abnormality occurring under the situation where the vehicle 1 moves on the road surface with a downhill grade, the vehicle speed V after the acceleration also becomes smaller as compared with the comparative example. Accordingly, in the present embodiment, even when the vehicle 1 naturally accelerates due to the brake control abnormality occurring under the situation where the vehicle 1 moves on the road surface with a downhill grade, the gear mechanism 154 operating as a brake device due to the occurrence of the brake control abnormality becomes easy to brake the vehicle as compared with the comparative example. Furthermore, in the present embodiment, even when the vehicle 1 naturally accelerates due to the brake control abnormality occurring under the situation where the vehicle 1 moves on the road surface with a downhill grade, the vehicle speed V is less likely to become larger than the allowable vehicle speed Val before the gear mechanism 154 starts to operate as a brake device as compared with the comparative example. Accordingly, in the present embodiment, even in the case where the brake control abnormality occurs under the situation where the vehicle 1 moves on the road surface with a downhill grade, the gear mechanism 154 operating as a brake device is more likely to be able to appropriately brake the vehicle 1 as compared with the comparative example.

The ECU 13 can further set the upper-limit vehicle speed Vlim of the vehicle speed V during the parking assist operation in accordance with the grade of the road surface on which the moving vehicle 1 positions by the parking assist operation positions (i.e., the road surface on which the vehicle 1 moves by the parking assist operation). When the vehicle 1 moves on the road surface with a downhill grade in particular, the first vehicle speed V1 is set as the upper-limit vehicle speed Vlim, the first vehicle speed V1 being able to realize the state where the vehicle speed V of the vehicle 1, which goes down the road surface with a downhill grade due to the brake control abnormality, does not exceed the allowable vehicle speed Val before the gear mechanism 154 starts to operate as a brake device. Accordingly, even in the case where the hydraulic brake device 152 stops operating normally under the situation where the vehicle 1 moves on the road surface with a downhill grade by the parking assist operation, the ECU 13 can appropriately brake the vehicle 1 by using the gear mechanism 154 as a brake device. Furthermore, when the vehicle 1 moves on the flat road surface or moves on the road surface with an uphill grade, the second vehicle speed V2 equal to or lower than the allowable vehicle speed Val is set as the upper-limit vehicle speed Vlim. Accordingly, even in the case where the hydraulic brake device 152 stops operating normally under the situation where the vehicle 1 moves on the flat road surface or moves on the road surface with an uphill grade by the parking assist operation, the ECU 13 can appropriately brake the vehicle 1 by using the gear mechanism 154 as a brake device.

Here, with reference to the timing charts illustrated in FIGS. 5A, 5B and FIGS. 6A to 6C, a specific description is given of the fact that the gear mechanism 154 can appropriately brake the vehicle 1 even in the case where the brake control abnormality occurs.

Figure 5A:
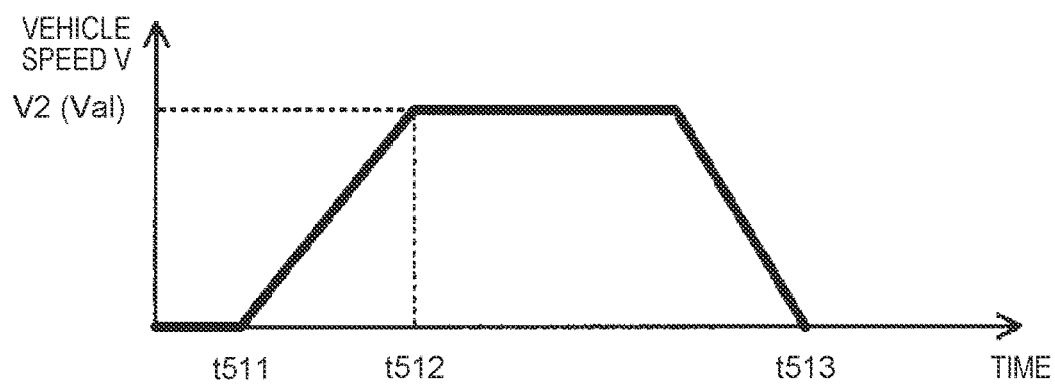
FIG. 5A is a timing chart illustrating time change of a vehicle speed V when a brake control abnormality does not occur under the situation where the parking assist operation is performed.

FIG. 5A is a timing chart illustrating time change of the vehicle speed V when the brake control abnormality does not occur under the situation where the vehicle 1 moves on the flat road surface or moves on the road surface with an uphill grade. As illustrated in FIG. 5A, the vehicle speed V starts to increase at time t511 when it is determined that execution of the parking assist operation is requested. Moreover, the second vehicle speed V2 is set as the upper-limit vehicle speed Vlim since the vehicle 1 moves on the flat road surface or moves on the road surface with an uphill grade. Then, at time t512, the vehicle speed V reaches the second vehicle speed V2. Accordingly, after time t512, the parking assist unit 133 moves the vehicle 1 such that the vehicle 1 does not accelerate. As a result, at time t513, the vehicle 1 reaches a target position.

Figure 5B:
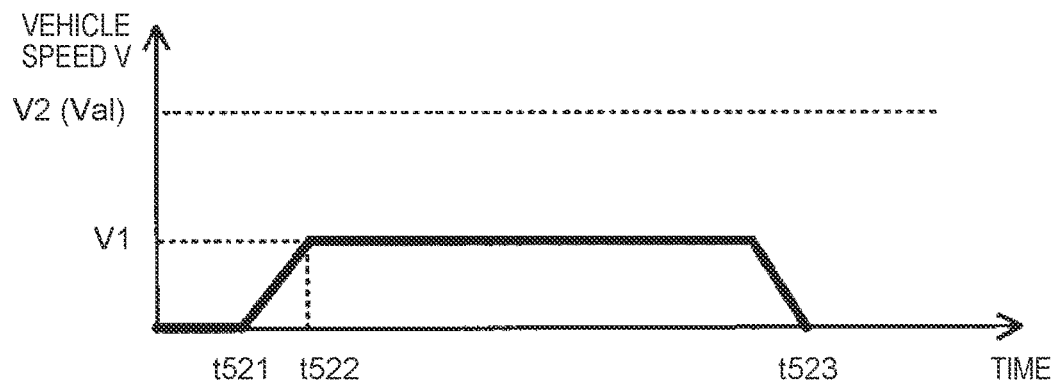
FIG. 5B is a timing chart illustrating time change of the vehicle speed V when the brake control abnormality does not occur under the situation where the parking assist operation is performed.

FIG. 5B is a timing chart illustrating time change of the vehicle speed V when the brake control abnormality does not occur under the situation where the vehicle 1 moves on the road surface with a downhill grade. As illustrated in FIG. 5B, the vehicle speed V starts to increase at time t521 when it is determined that execution of the parking assist operation is requested. Then, at time t522, the vehicle speed V reaches the first vehicle speed V1. Accordingly, after time t522, the parking assist unit 133 moves the vehicle 1 such that the vehicle 1 does not accelerate. As a result, at time t523, the vehicle 1 reaches a target position.

Figure 6A:
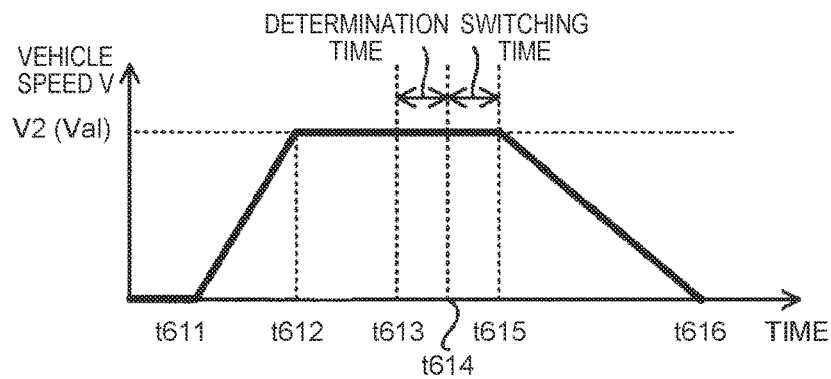
FIG. 6A is a timing chart illustrating time change of the vehicle speed V when the brake control abnormality occurs under the situation where the parking assist operation is performed.

FIG. 6A is a timing chart illustrating time change of the vehicle speed V when the brake control abnormality occurs under the situation where the vehicle 1 moves on the flat road surface or moves on the road surface with an uphill grade. As illustrated in FIG. 6A, the vehicle speed V starts to increase at time t611 when it is determined that execution of the parking assist operation is requested. Then, at time t612, the vehicle speed V reaches the second vehicle speed V2. Then, at time t613, the brake control abnormality occurs. In this case, at time t613, the parking assist unit 133 does not determine the occurrence of the brake control abnormality. Therefore, the parking assist unit 133 keeps on moving the vehicle 1 along the moving route. However, since the vehicle 1 is traveling on the flat road surface or the road surface with an uphill grade, the vehicle 1 does not naturally accelerate even though the brake control abnormality occurs. Accordingly, the vehicle 1 keeps on moving such that the vehicle speed V does not exceed the second vehicle speed V2. Then, at time 614 after the lapse of determination time from time t613, the parking assist unit 133 determines the occurrence of the brake control abnormality. Furthermore, at time t615 after the lapse of switching time from time t614, switching of the gear range of the gear mechanism 154 to the P range is completed. As a result, at time t615, the parking assist unit 133 ends the parking assist operation, while the gear mechanism 154 starts to brake the vehicle 1. Consequently, the vehicle speed V starts to decrease at time t615. As a result, at time t616, the vehicle 1 stops.

Figure 6B:
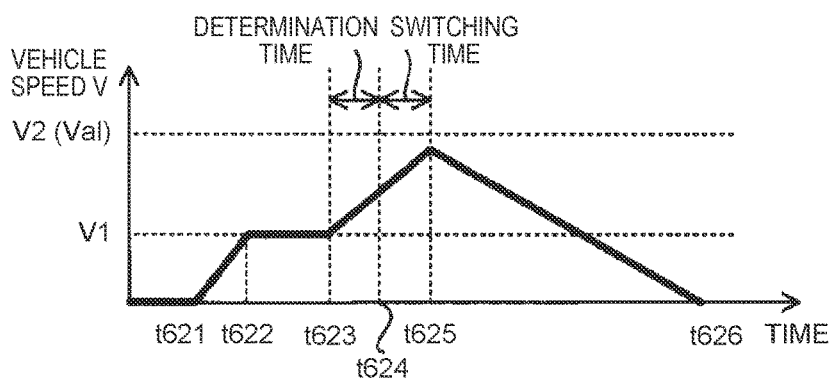
FIG. 6B is a timing chart illustrating time change of the vehicle speed V when the brake control abnormality occurs under the situation where the parking assist operation is performed.

FIG. 6B is a timing chart illustrating time change of the vehicle speed V when the brake control abnormality occurs under the situation where the vehicle 1 moves on the road surface with a downhill grade. As illustrated in FIG. 6B, the vehicle speed V starts to increase at time t621 when it is determined that execution of the parking assist operation is requested. Then, at time t622, the vehicle speed V reaches the first vehicle speed V1. Then, at time t623, the brake control abnormality occurs. Here, since the vehicle 1 travels on the road surface with a downhill grade, the parking assist unit 133 should brake the vehicle 1 with the hydraulic brake device 152 so as to move the vehicle 1 such that the vehicle speed V does not exceed the first vehicle speed V1. When the brake control abnormality occurs in such a situation, the vehicle 1 naturally accelerates since the vehicle 1 goes down the road surface with a downhill grade. Therefore, as illustrated in FIG. 6B, the vehicle speed V starts to increase at time t623. Then, at time t624 after the lapse of the determination time from time t623, the parking assist unit 133 determines the occurrence of the brake control abnormality. Furthermore, at time t625 after the lapse of the switching time from time t624, switching of the gear range of the gear mechanism 154 to the P range is completed. Here, since the first vehicle speed V1 is set as described in the foregoing, the vehicle speed V does not exceed the allowable vehicle speed Val at time t625. Therefore, at time t625, switching of the gear range of the gear mechanism 154 to the P range is completed. As a result, at time t625, the parking assist unit 133 ends the parking assist operation, while the gear mechanism 154 starts to brake the vehicle 1. Consequently, the vehicle speed V starts to decrease at time t625. As a result, at time t626, the vehicle 1 stops.

Figure 6C:
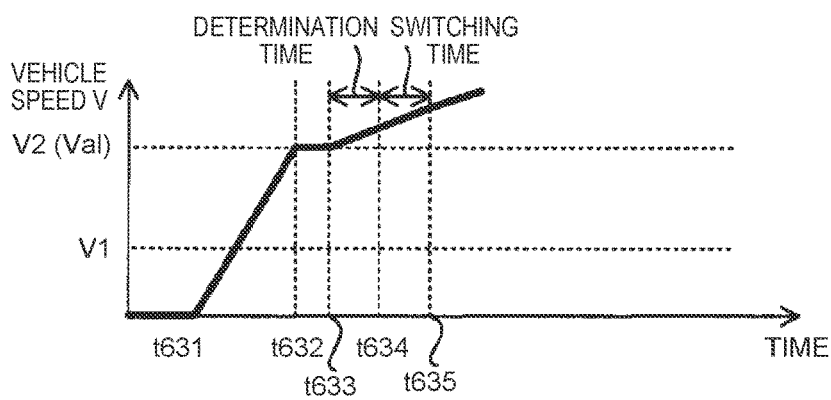
FIG. 6C is a timing chart illustrating time change of the vehicle speed V when the brake control abnormality occurs under the situation where the parking assist operation is performed.

For reference, FIG. 6C is a timing chart illustrating time change of the vehicle speed V when the brake control abnormality occurs under the situation where the vehicle 1 moves on the road surface with a downhill grade though the upper-limit vehicle speed Vlim is set to the second vehicle speed V2 (i.e., the allowable vehicle speed Val). As illustrated in FIG. 6C, the vehicle speed V starts to increase at time t631 when it is determined that execution of the parking assist operation is requested. Then, at time t632, the vehicle speed V reaches the second vehicle speed V2. Then, at time t633, the brake control abnormality occurs. Therefore, as illustrated in FIG. 6C, the vehicle speed V starts to increase at time t6333. That is, the vehicle speed V increases beyond the allowable vehicle speed Val. Then, at time t634 after the lapse of the determination time from time t633, the parking assist unit 133 determines the occurrence of the brake control abnormality. Furthermore, at time t635 after the lapse of the switching time from time t634, switching of the gear range of the gear mechanism 154 to the P range should be completed. However, as illustrated in FIG. 6C, since the vehicle speed V is beyond the allowable vehicle speed Val at t635, switching of the gear range of the gear mechanism 154 to the P range is not completed. That is, the gear mechanism 154 does not operate as a brake device.

(4) Modification (4-1) First Modification

Figure 7:
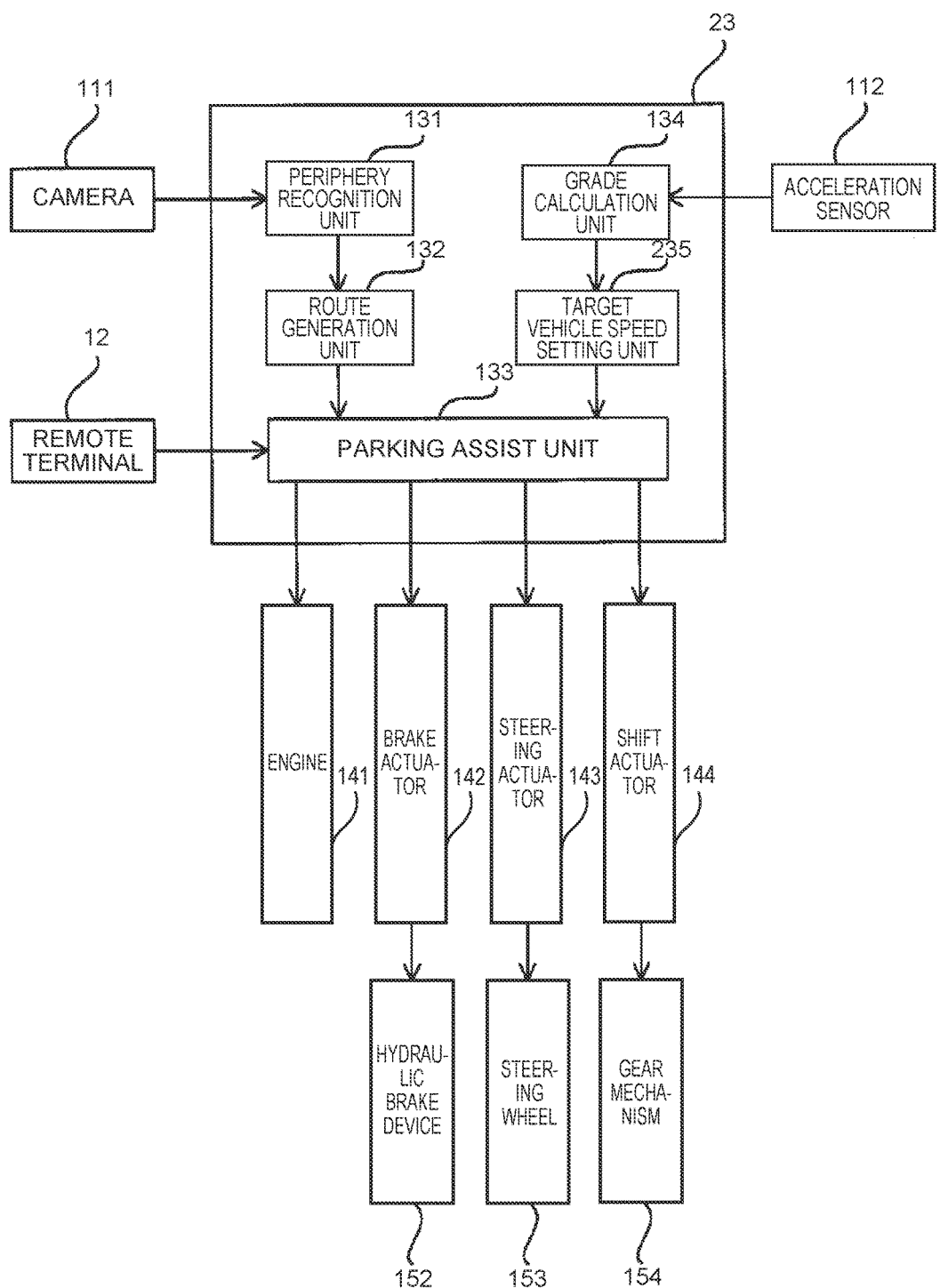
FIG. 7 is a block diagram illustrating the configuration of a vehicle in a first modification.

The configuration of a vehicle 2 in a first modification will be described with reference to FIG. 7. Component members identical to those included in the vehicle 1 described in the foregoing are designated by identical reference signs to omit a detailed description thereof. As illustrated in FIG. 7, the vehicle 2 is different from the vehicle 1 in that the ECU 13 is replaced with an ECU 23. The ECU 23 is difference from the ECU 13 in that target vehicle speed setting operation is performed in place of the aforementioned upper-limit vehicle speed setting operation, the target vehicle speed setting operation setting a target value (referred to as "target speed" below) Vtgt of the vehicle speed V of the vehicle 2 during the period when the parking assist operation is performed. The target vehicle speed Vtgt is one specific example of "the target value" described before. The ECU 23 that performs the target vehicle speed setting operation is different from the ECU 13 in that the upper limit vehicle-speed setting unit 135 is replaced with a target vehicle speed setting unit 235. The target vehicle speed setting unit 235 sets the target vehicle speed Vtgt based on a calculation result of the grade calculation unit 134. The parking assist unit 133 moves the vehicle 1 to a target position, while controlling the vehicle speed V to follow after the target speed Vtgt (in other words, to coincide with the target speed Vtgt). For example, the parking assist unit 133 calculates driving force or braking force for achieving the set target vehicle speed Vtgt, and controls at least one of the component members from the engine 141 to the shift actuators 144 to obtain the calculated driving force or braking force. In this case, it can be said that the parking assist unit 133 performs feedforward control so that the vehicle speed V follows after the set target vehicle speed Vtgt. The parking assist unit 133 may monitor an actual vehicle speed V detected by a vehicle speed sensor which is not illustrated, and may control at least one of the component members from the engine 141 to the shift actuators 144 so that a difference between the actual vehicle speed V and the target vehicle speed Vtgt decreases (preferably decreases to zero). In this case, it can be said that the parking assist unit 133 performs feedback control so that the vehicle speed V follows after the set target vehicle speed Vtgt.

Figure 8:
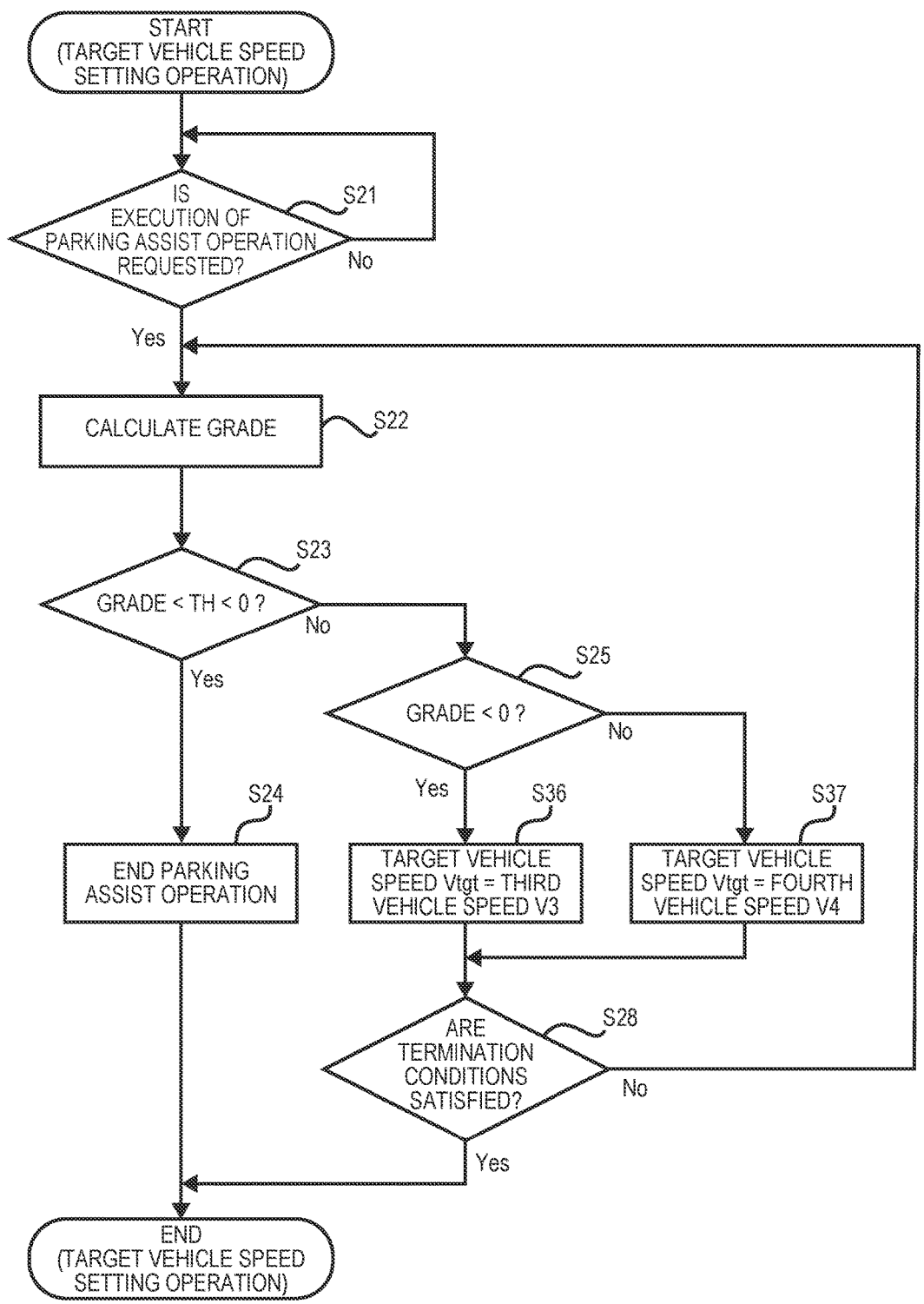
FIG. 8 is a flowchart illustrating the flow of target vehicle speed setting operation in the first modification.

Now a description is given of the flow of the target vehicle speed setting operation in the first modification with reference to FIG. 8. Processing steps identical to those in the aforementioned upper-limit vehicle speed setting operation are designated by identical step numbers to omit a detailed description thereof. As illustrated in FIG. 8, the target vehicle speed setting operation is different from the upper-limit vehicle speed setting operation in that the target vehicle speed setting unit 235 sets a third vehicle speed V3 as the target vehicle speed Vtgt (step S36) when it is determined that the grade is smaller than 0% (step S25: Yes). The target vehicle speed setting operation is further different from the upper-limit vehicle speed setting operation in that the target vehicle speed setting unit 235 sets a fourth vehicle speed V4 larger than the third vehicle speed V3 as the target vehicle speed Vtgt (step S37) when it is determined that the grade is not smaller than 0% (Step S25: No). Other processing steps of the target vehicle speed setting operation in the first modification may be identical to those in the aforementioned upper-limit vehicle speed setting operation.

Like the first vehicle speed V1 described before, the third vehicle speed V3 is a value that can realize the state where the vehicle speed V of the vehicle 2, which naturally goes down the road surface with a downhill grade due to a brake control abnormality, does not exceed the allowable vehicle speed Val before the gear mechanism 154 starts to operate as a brake device. Accordingly, the target vehicle speed setting unit 235 sets the third vehicle speed V3 which satisfies an expression V3≤Val−ΔV (see FIG. 9A) or V3≤Val−ΔVst (see FIG. 9B) as the target vehicle speed Vtgt. The target vehicle speed setting unit 235 also sets a fourth vehicle speed V4 which satisfies an expression V4≤Val (see FIG. 9A or 9B) as the target vehicle speed Vtgt.

Figure 9A:
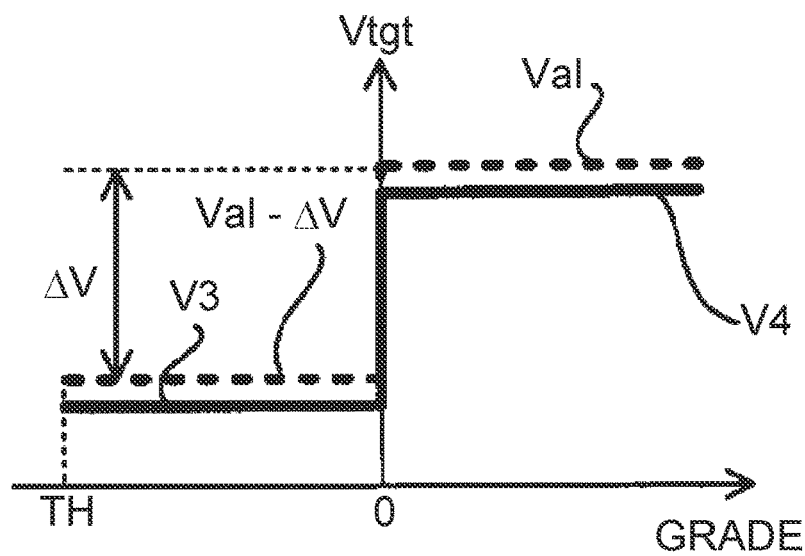
FIG. 9A is a graph view illustrating a relation between the grade of the road surface on which the vehicle is positioned and a target vehicle speed.
Figure 9B:
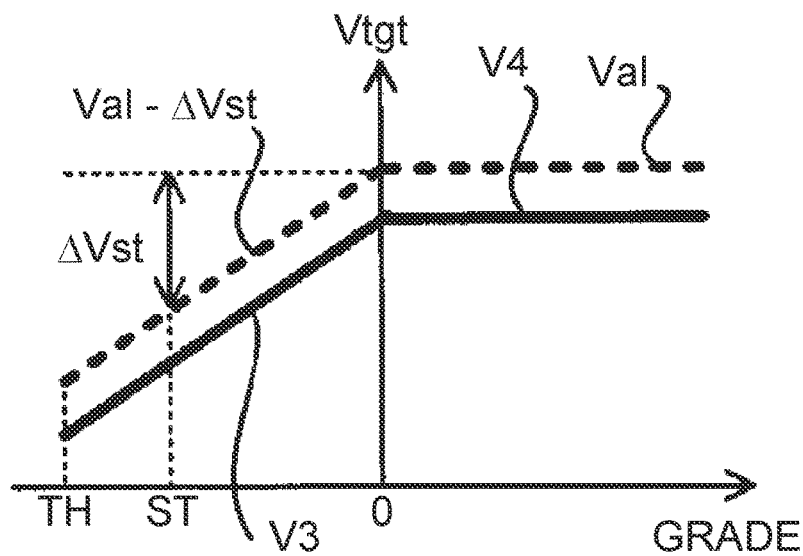
FIG. 9B is a graph view illustrating a relation between the grade of the road surface on which the vehicle is positioned and the target speed vehicle.

The target vehicle speed setting unit 235 may set the third vehicle speed V3 which takes a fixed value regardless of the magnitude of the grade as the target vehicle speed Vtgt (see FIG. 9A). The target vehicle speed setting unit 235 may set, as the target vehicle speed Vtgt, the third vehicle speed V3 which continuously becomes smaller or becomes smaller in stages as the grade becomes smaller (see FIG. 9B). The target vehicle speed setting unit 235 may set the fourth vehicle speed V4 which takes a fixed value regardless of the magnitude of the grade as a target vehicle speed Vtgt. The target vehicle speed setting unit 235 may set, as the target vehicle speed Vtgt, the fourth vehicle speed V4 which becomes continuously smaller or becomes smaller in stages as the grade becomes smaller.

The vehicle 2 in the thus-configured first modification can also properly receive the full benefit of the technical effects that the vehicle 1 can receive.

In the first modification, the ECU 23 may perform the upper-limit vehicle speed setting operation in addition to the target vehicle speed setting operation. In this case, the ECU 23 moves the vehicle 2 such that the vehicle speed V follows after the target vehicle speed Vtgt without exceeding the upper-limit vehicle speed Vlim. In this case, the target vehicle speed Vtgt is set to the upper-limit vehicle speed Vlim or lower.

(4-2) Other Modifications

In the upper-limit vehicle speed setting operation described before, the upper-limit vehicle speed setting operation is repeatedly performed while the parking assist operation is performed. However, the upper-limit vehicle speed setting operation may be performed only once at the start of the parking assist operation. In this case, while the parking assist operation is performed, the upper-limit vehicle speed Vlim, which is set in the upper-limit vehicle speed setting operation performed at the beginning of the parking assist operation, is continuously used. This also applies to the target vehicle speed setting operation.

In the above description, the grade calculation unit 134 calculates the grade of the road surface on which the vehicle 1 currently positions. However, the grade calculation unit 134 may calculate (i.e., estimate) the grade of a road surface to which the vehicle 1 is expected to move in the future. For example, the grade calculation unit 134 may calculate the grade of a moving route to a target position in cooperation with a navigation device that stores map information including grade information about the grade of road surfaces.

The vehicle 1 may repeatedly be parked at the same target position. For example, there is a high possibility that the vehicle 1 owned by a certain user is repeatedly parked at a parking place in the residence of the user. In this case, when the parking assist operation is performed for the first time to move the vehicle 1 to a certain target position, the grade calculation unit 134 calculates the grade of a moving route thereto. When the parking assist operation is performed second and subsequent time to move the vehicle 1 to the same target position, the grade calculation unit 134 does not need to calculate the grade. When the parking assist operation is performed second and subsequent time, the upper limit vehicle-speed setting unit 135 may set the upper-limit vehicle speed Vlim using the grade calculated when the parking assist operation is performed for the first time. Or when the second parking assist operation is performed second and subsequent time, the upper limit vehicle-speed setting unit 135 may directly use the upper-limit vehicle speed Vlim set when the parking assist operation is performed for the first time. This also applies to setting of the target vehicle speed Vtgt.

In addition to or in place of the gear mechanism 154, the vehicle 1 may include a given device that is usable as a brake device when the vehicle speed V is smaller than the allowable vehicle speed Val but is not usable as a brake device when the vehicle speed V is larger than the allowable vehicle speed Val. In this case, since the aforementioned upper-limit vehicle speed setting operation or target vehicle speed setting operation is performed, the vehicle 1 is appropriately braked by using the given device as a brake device even in the case where the brake control abnormality occurs under the situation where the vehicle 1 moves on the road surface with a downhill grade by the parking assist operation.

The parking assist device may be configured to: at the time of braking the vehicle while the parking assist is in operation, brake the vehicle by controlling a hydraulic first brake device operable to brake the vehicle; when an abnormality occurs during the parking assist, the abnormality being a failure in controlling the first brake device to brake the vehicle, brake the vehicle with a second brake device different in type from the hydraulic, the second brake device being allowed to operate under a situation where the vehicle speed is smaller than a specified allowable value while being prohibited to operate under a situation where the vehicle speed is larger than the allowable value; and set the upper limit in the case where the vehicle is determined to move on the road surface having a downhill grade to be equal to or lower than a value obtained by subtracting an increment of the vehicle speed from the allowable value, the increment of the vehicle speed being assumed on a supposition that the vehicle not braked by the first brake device moves on a road surface with a largest downhill grade over a prescribed period, the road surface with the largest downhill grade being preset as a road surface where the parking assist is applicable. The prescribed period may be a period required for starting operation of the second brake device after occurrence of the abnormality.

According to the above configuration, even when the vehicle accelerates on the road surface with a downhill grade due to the brake control abnormality where the parking assist device fails to control the first brake device (i.e., the normal brake device) to brake the vehicle, the vehicle speed hardly or never becomes larger than the allowable value before the second brake device (i.e., the emergency brake device) starts to operate. As a result, even when the brake control abnormality occurs under the situation where the vehicle moves on the road surface with a downhill grade, the vehicle is appropriately braked by the second brake device.

The parking assist device may be configured to: when the vehicle is determined to travel on the road surface having a downhill grade, set the upper limit to be smaller as an absolute value of the downhill grade of the road surface becomes larger.

According to the above configuration, the upper limit is appropriately set in accordance with the magnitude of the downhill grade as described later in detail.

In the parking assist device, the electronic control unit may be configured to: at the time of braking the vehicle during the parking assist, brake the vehicle by controlling a hydraulic first brake device operable to brake the vehicle; when an abnormality occurs during the parking assist, the abnormality being a failure in controlling the first brake device to brake the vehicle, brake the vehicle with a second brake device different in type from the hydraulic, the second brake device being allowed to operate under the situation where the vehicle speed is smaller than a specified allowable value while being prohibited to operate under a situation where the vehicle speed is larger than the allowable value; at the time of determining whether or not the vehicle moves on the road surface with a downhill grade, acquire a grade of the road surface where the vehicle moves by the parking assist; and set the upper limit in the case where the vehicle is determined to move on a road surface having a specified downhill grade to be equal to or lower than a value obtained by subtracting an increment of the vehicle speed from the allowable value, the increment of the vehicle speed being assumed on a supposition that the vehicle not braked by the first brake device moves on the road surface with the specified downhill grade over a prescribed period. The prescribed period may be a period required for starting operation of the second brake device after occurrence of the abnormality.

According to the above configuration, even when the vehicle accelerates on the road surface with a downhill grade due to the brake control abnormality, the vehicle speed hardly or never becomes larger than the allowable value before the second brake device starts to operate. As a result, even when the brake control abnormality occurs under the situation where the vehicle moves on the road surface with a downhill grade, the vehicle is appropriately braked by the second brake device.

In the parking assist device, the electronic control unit may be configured to set the upper limit in the case where the vehicle is not determined to move on the road surface having a downhill grade to be equal to or lower than the allowable value.

According to the configuration, the upper limit in the case where the vehicle moves on a flat road surface or a road surface with an uphill grade is appropriately set. As a result, even when the brake control abnormality occurs under the situation where the vehicle moves on the flat road surface or the road surface with an uphill grade, the vehicle is appropriately braked by the second brake device.

In the parking assist device, the electronic control unit may be configured to: perform the parking assist while causing the vehicle speed to follow after a target value; and set the target value in the case where the vehicle is determined to move on the road surface having a downhill grade to be smaller than the target value in the case where the vehicle is not determined to move on the road surface having a downhill grade.

In the above configuration, the target value of the vehicle speed in the case where the vehicle moves on the road surface with a downhill grade is set smaller than the target value of the vehicle speed in the case where the vehicle does not move on the road surface with a downhill grade. Accordingly, even when the brake control abnormality occurs during the parking assist, the vehicle is appropriately braked.

The electronic control unit may be configured to: at the time of braking the vehicle during the parking assist, brake the vehicle by controlling a hydraulic first brake device operable to brake the vehicle; when an abnormality occurs during the parking assist, the abnormality being a failure in controlling the first brake device to brake the vehicle, brake the vehicle with a second brake device different in type from the hydraulic, the second brake device being allowed to operate under the situation where the vehicle speed is smaller than a specified allowable value while being prohibited to operate under the situation where the vehicle speed is larger than the allowable value; set the target value in the case where the vehicle is determined to move on the road surface having a downhill grade to be equal to or lower than a value obtained by subtracting an increment of the vehicle speed from the allowable value, the increment of the vehicle speed being assumed on a supposition that the vehicle not braked by the first brake device moves on a road surface with a largest downhill grade over a prescribed period, the road surface with the largest downhill grade being preset as a road surface where the parking assist is applicable. The prescribed period may be a period required for starting operation of the second brake device after occurrence of the abnormality.

In the parking assist device, the electronic control unit may be configured to, when the vehicle is determined to travel on the road surface having a downhill grade, set the target value to be smaller as an absolute value of the downhill grade of the road surface becomes larger.

The electronic control unit may be configured to: at the time of braking the vehicle during the parking assist, brake the vehicle by controlling a hydraulic first brake device operable to brake the vehicle; when an abnormality occurs during the parking assist, the abnormality being a failure in controlling the first brake device to brake the vehicle, brake the vehicle with a second brake device different in type from the hydraulic, the second brake device being allowed to operate under the situation where the vehicle speed is smaller than a specified allowable value while being prohibited to operate under the situation where the vehicle speed is larger than the allowable value; at the time of determining whether or not the vehicle moves on the road surface with a downhill grade, acquire a grade of the road surface where the vehicle moves by the parking assist; and set the target value in the case where the vehicle is determined to move on the road surface having a specified downhill grade to be equal to or lower than a value obtained by subtracting an increment of the vehicle speed from the allowable value, the increment of the vehicle speed being assumed on a supposition that the vehicle not braked by the first brake device moves on the road surface with the specified downhill grade over a prescribed period. The prescribed period may be a period required for starting operation of the second brake device after occurrence of the abnormality.

According to the above configuration, the setting unit sets the target value in the case where the vehicle is not determined to move on the road surface having a downhill grade to be equal to or lower than the allowable value.

The present disclosure can appropriately be modified without departing from the concept of the disclosure understandable from the appended claims and throughout the specification. Therefore, the parking assist devices having such modifications are intended to be embraced in the technical concept of the present disclosure.

What is claimed is:

1. A parking assist device, comprising:
an electronic control unit configured to:
perform parking assist of a vehicle to automatically park the vehicle at a target position, while restricting a vehicle speed to an upper limit or lower in accordance with an instruction of a user who is outside the vehicle, and control a first brake device configured to brake the vehicle or a second brake device that is configured to brake the vehicle, when the vehicle is braked during the parking assist, and wherein the second brake device is different from the first brake device;
determine whether or not the vehicle moves on a road surface having a downhill grade along a travelling direction of the vehicle by the parking assist;
set the upper limit in a case where the vehicle is determined to move on the road surface having the downhill grade to be smaller than the upper limit in a case where the vehicle is not determined to move on the road surface having the downhill grade; and
control the second brake device to brake the vehicle when an abnormality occurs during the parking assist, the abnormality being a failure in controlling the first brake device to brake the vehicle, wherein
the first brake device is hydraulic,
the second brake device is different from a hydraulic brake device, the second brake device being allowed to operate under a situation where the vehicle speed is smaller than a specified allowable value while being prohibited to operate under a situation where the vehicle speed is larger than the allowable value; and
the electronic control unit is further configured to:
set the upper limit in the case where the vehicle is determined to move on the road surface having the downhill grade to be equal to or lower than a value obtained by subtracting an increment of the vehicle speed from the allowable value, the increment of the vehicle speed being assumed on a supposition that the vehicle not braked by the first brake device moves on a road surface with a largest downhill grade over a prescribed period, the road surface with the largest downhill grade being preset as a road surface where the parking assist is applicable, and
the prescribed period is a period required for starting operation of the second brake device after occurrence of the abnormality.

2. The parking assist device according to claim 1, wherein the electronic control unit is further configured to determine whether or not the abnormality occurs based on the upper limit in the case where the vehicle is not determined to move on the road surface having the downhill grade.

3. A parking assist device, comprising:
an electronic control unit configured to:
perform parking assist of a vehicle to automatically park the vehicle at a target position, while restricting a vehicle speed to an upper limit or lower in accordance with an instruction of a user who is outside the vehicle, and control a first brake device configured to brake the vehicle or a second brake device that is configured to brake the vehicle, when the vehicle is braked during the parking assist, and wherein the second brake device is different from the first brake device;
determine whether or not the vehicle moves on a road surface having a downhill grade along a travelling direction of the vehicle by the parking assist;
set the upper limit in a case where the vehicle is determined to move on the road surface having the downhill grade to be smaller than the upper limit in a case where the vehicle is not determined to move on the road surface having the downhill grade; and
control the second brake device to brake the vehicle when an abnormality occurs during the parking assist, the abnormality being a failure in controlling the first brake device to brake the vehicle, wherein
the first brake device is hydraulic,
the second brake device is different from a hydraulic brake device, the second brake device being allowed to operate under a situation where the vehicle speed is smaller than a specified allowable value while being prohibited to operate under a situation where the vehicle speed is larger than the allowable value;
at a time of determining whether or not the vehicle moves on the road surface with the downhill grade, acquire a grade of the road surface where the vehicle moves by the parking assist; and
set the upper limit in the case where the vehicle is determined to move on a road surface having a specified downhill grade to be equal to or lower than a value obtained by subtracting an increment of the vehicle speed from the allowable value, the increment of the vehicle speed being assumed on a supposition that the vehicle not braked by the first brake device moves on the road surface with the specified downhill grade over a prescribed period, and
the prescribed period is a period required for starting operation of the second brake device after occurrence of the abnormality.

4. The parking assist device according to claim 3, wherein the electronic control unit is configured to set the upper limit in the case where the vehicle is not determined to move on the road surface having the downhill grade to be equal to or lower than the allowable value.

5. A parking assist device, comprising:
an electronic control unit configured to:
perform parking assist of a vehicle to automatically park the vehicle at a target position while controlling a vehicle speed to follow after a target value in accordance with an instruction of a user who is outside the vehicle, and control a first brake device configured to brake the vehicle or a second brake device that is configured to brake the vehicle, when the vehicle is braked during the parking assist, and wherein the second brake device is different from the first brake device;

determine whether or not the vehicle moves on a road surface having a downhill grade along a travelling direction of the vehicle by the parking assist;

set the target value in a case where the vehicle is determined to move on the road surface having the downhill grade to be smaller than the target value in a case where the vehicle is not determined to move on the road surface having the downhill grade; and control the second brake device to brake the vehicle when an abnormality occurs during the parking assist, the abnormality being a failure in controlling the first brake device to brake the vehicle, wherein the first brake device is hydraulic, the second brake device different from a hydraulic brake device, the second brake device being allowed to operate under a situation where the vehicle speed is smaller than a specified allowable value while being prohibited to operate under a situation where the vehicle speed is larger than the allowable value; and set the target value in the case where the vehicle is determined to move on the road surface having the downhill grade to be equal to or lower than a value obtained by subtracting an increment of the vehicle speed from the allowable value, the increment of the vehicle speed being assumed on a supposition that the vehicle not braked by the first brake device moves on a road surface with a largest downhill grade over a prescribed period, the road surface with the largest downhill grade being preset as a road surface where the parking assist is applicable, and the prescribed period is a period required for starting operation of the second brake device after occurrence of the abnormality.

6. The parking assist device according to claim 5, wherein the electronic control unit is configured to, when the vehicle is determined to travel on the road surface having the downhill grade, set the target value to be smaller as an absolute value of the downhill grade of the road surface becomes larger.

7. A parking assist device, comprising:
an electronic control unit configured to:
perform parking assist of a vehicle to automatically park the vehicle at a target position while controlling a vehicle speed to follow after a target value in accordance with an instruction of a user who is outside the vehicle, and control a first brake device configured to brake the vehicle or a second brake device that is configured to brake the vehicle, when the vehicle is braked during the parking assist, and wherein the second brake device is different from the first brake device;

determine whether or not the vehicle moves on a road surface having a downhill grade along a travelling direction of the vehicle by the parking assist;

set the target value in a case where the vehicle is determined to move on the road surface having the downhill grade to be smaller than the target value in a case where the vehicle is not determined to move on the road surface having the downhill grade; and control the second brake device to brake the vehicle when an abnormality occurs during the parking assist, the abnormality being a failure in controlling the first brake device to brake the vehicle, wherein the first brake device is hydraulic, the second brake device is different from a hydraulic brake device, the second brake device being allowed to operate under a situation where the vehicle speed is smaller than a specified allowable value while being prohibited to operate under a situation where the vehicle speed is larger than the allowable value;

at a time of determining whether or not the vehicle moves on the road surface with the downhill grade, acquire a grade of the road surface where the vehicle moves by the parking assist; and set the target value in the case where the vehicle is determined to move on a road surface having a specified downhill grade to be equal to or lower than a value obtained by subtracting an increment of the vehicle speed from the allowable value, the increment of the vehicle speed being assumed on a supposition that the vehicle not braked by the first brake device moves on the road surface with the specified downhill grade over a prescribed period, and the prescribed period is a period required for starting operation of the second brake device after occurrence of the abnormality.

8. The parking assist device according to claim 5, wherein the electronic control unit is configured to set the target value in the case where the vehicle is not determined to move on the road surface having the downhill grade to be equal to or lower than the allowable value.

* * * * *